United States Patent [19]
Eckard et al.

[11] Patent Number: 5,947,531
[45] Date of Patent: Sep. 7, 1999

[54] QUICK CONNECTOR ASSEMBLY

[75] Inventors: Duane Eckard, Loves Park, Ill.; Mark Thomas Van de Bogert, Walworth, Wis.

[73] Assignee: Miniature Precision Components, Inc., Walworth, Wis.

[21] Appl. No.: 08/887,912

[22] Filed: Jul. 3, 1997

[51] Int. Cl.⁶ ..................................... F16L 39/00
[52] U.S. Cl. ........................ 285/319; 285/320; 285/423
[58] Field of Search ................................ 285/320, 319, 285/423

[56] References Cited

U.S. PATENT DOCUMENTS

| | | |
|---|---|---|
| 80,407 | 7/1868 | Hanson et al. . |
| 309,444 | 12/1884 | Dunning . |
| 342,527 | 5/1886 | McCoy . |
| 2,722,399 | 11/1955 | Oetiker . |
| 2,795,985 | 6/1957 | Wilson . |
| 3,602,009 | 8/1971 | Powell ................................ 285/319 X |
| 3,711,125 | 1/1973 | Dehar ................................. 285/319 X |
| 4,045,055 | 8/1977 | Blakely . |
| 5,401,063 | 3/1995 | Plosz ................................. 285/319 X |
| 5,452,924 | 9/1995 | Kujawski .......................... 285/320 X |
| 5,518,278 | 5/1996 | Sampson . |
| 5,725,258 | 3/1998 | Kujawski .......................... 285/319 X |

FOREIGN PATENT DOCUMENTS 448790  10/1991  European Pat. Off. ............... 285/319

*Primary Examiner*—Dave W. Arola
*Attorney, Agent, or Firm*—Dinnin & Dunn, P.C.

[57] ABSTRACT

A connector assembly for conveying fluids, the connector assembly includes a retainer member positioned and locked inside a housing having an axial bore for receiving one end of a male conduit member. A locking arm is flexibly attached to one end of the retainer member to lock the male conduit member into the housing by engaging an annular collar located a given distance from approximal end of said male conduit member thereby providing a fluid tight connection.

8 Claims, 2 Drawing Sheets

QUICK CONNECTOR ASSEMBLY

FIELD OF THE INVENTION

The present invention relates to quick connector assemblies for conduits used for conveying fluids, and more particularly, to housing and retainer members with the retainer member having a locking arm to allow a male conduit member to be connected or released by a single, ergonomical motion.

BACKGROUND OF THE INVENTION

A number of connector assemblies for conduits have been developed permitting a male connector member to be attached to a housing. The first connectors typically had threaded ends to allow a screwing connection. However, these connectors required substantial assembly time and considerable twisting force not conducive to ergonomics.

More recent connector assemblies are of a quick connection variety typically including a male connector member, a housing, and a retainer member secured in the housing to provide for a fluid tight cooperation between the male connector member and housing. While the quick connector assemblies are improvements over the previous threaded variety, the present embodiments have a number of disadvantages:

(1) the designs do not allow for a single, ergonomically motion for releasing the male connector member from the housing;

(2) some designs require a fourth member to either release or lock the connector members;

(3) some designs utilize flexible arcuate locking members requiring substantial force to release or attach the connector members, and furthermore, are ergonomically unsound;

(4) some designs necessitate having a separate tool to remove the retainer member increasing manufacturing costs and practicality considerations.

Wherefore, it is an object of the present invention to provide a design of a quick connector assembly that allows for a single, ergonomical motion for positioning a male conduit member into a housing to lock both members into place.

Another object of the invention is to provide a quick connector assembly that has only three members negating the necessity of a fourth member, or extra tool, for locking-releasing the members.

Still another object of the invention is to provide a design of a quick connector assembly that allows for a single, ergonomical motion for releasing a male conduit member from a housing.

SUMMARY OF THE INVENTION

The present invention is directed to a quick connector assembly that satisfies the foregoing objects and advantages. A quick connector assembly having features of the present invention includes a retainer member, a housing, and a male conduit member all having axial bores along a longitudinal axis for the passage of fluid. These couplings provide a fluid tight connection between conduits that can be quickly connected or disconnected.

The housing has openings to receive and lock the retainer member inside the housing. One end of the retainer member extends outside the housing to form a flexible, arcuate locking arm having a beveled edge and axially spaced from a portion of the retainer member. The male conduit member is tubular with an annular collar located a given distance from the proximal end of the male conduit member. The male conduit member is pushed through the retainer into the housing until the annular collar engages the beveled surface of the locking arm to cam the locking arm away from the male conduit member until the annular collar rests in the axial space between locking arm and retainer member thereby locking the male conduit member inside the housing to create the fluid tight connection.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE PREFERRED EMBODIMENT(S) AND BEST MODE OF CARRYING OUT THE INVENTION

Figure 1:
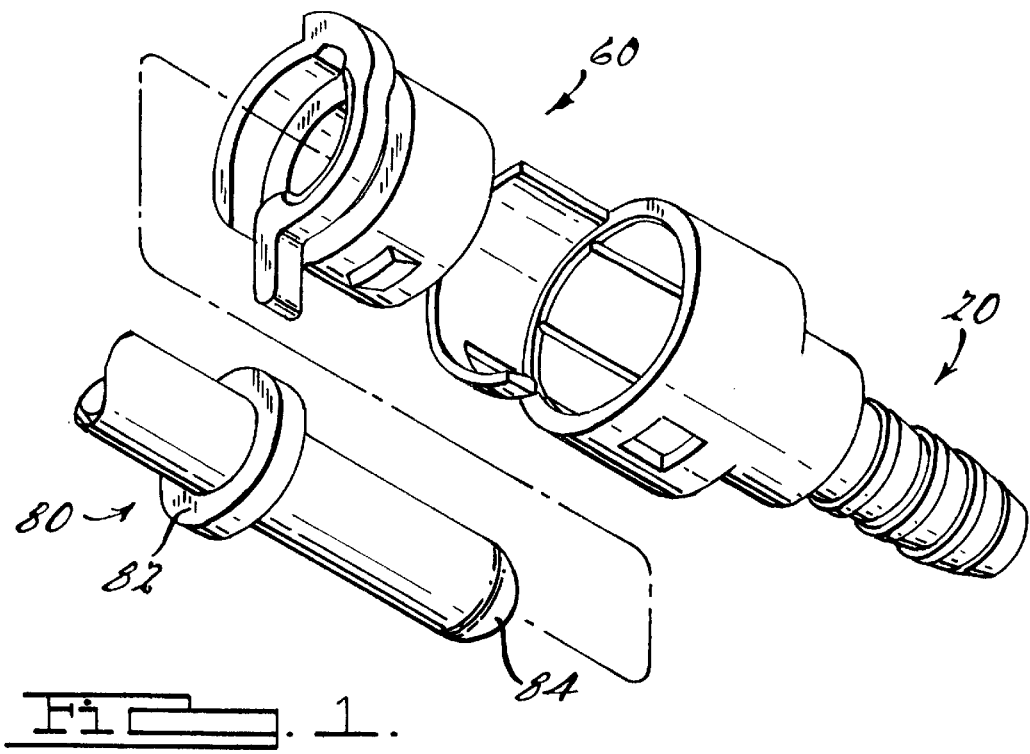
FIG. 1 is an exploded perspective view of an embodiment of a quick connector assembly according to the present invention.

Referring now in greater detail to the drawings, FIG. 1 illustrates an exploded embodiment of the present invention, a quick connector assembly. The quick connector assembly includes a housing 20, a retainer member 60, and a male conduit member 80.

Figure 2:
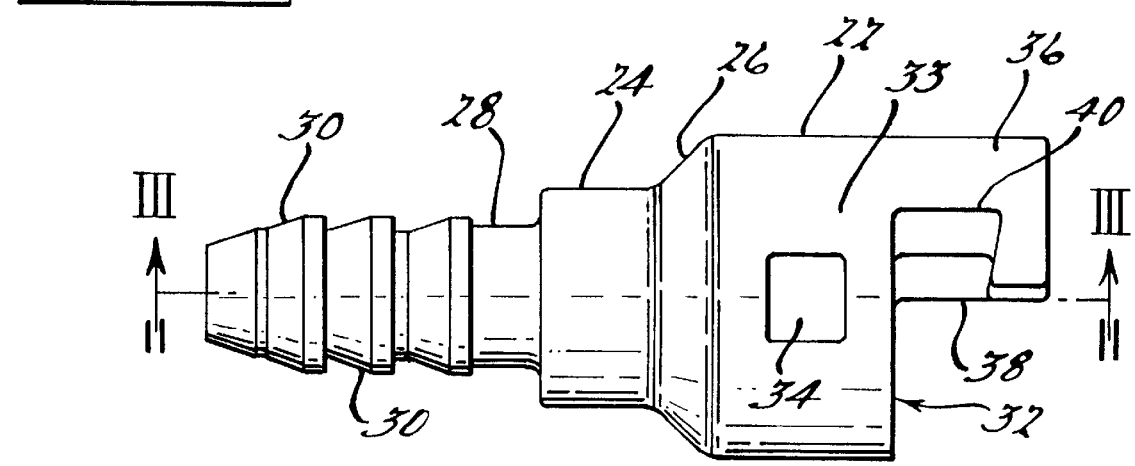
FIG. 2 is a side view of the housing for the present invention of FIG. 1.
Figure 3:
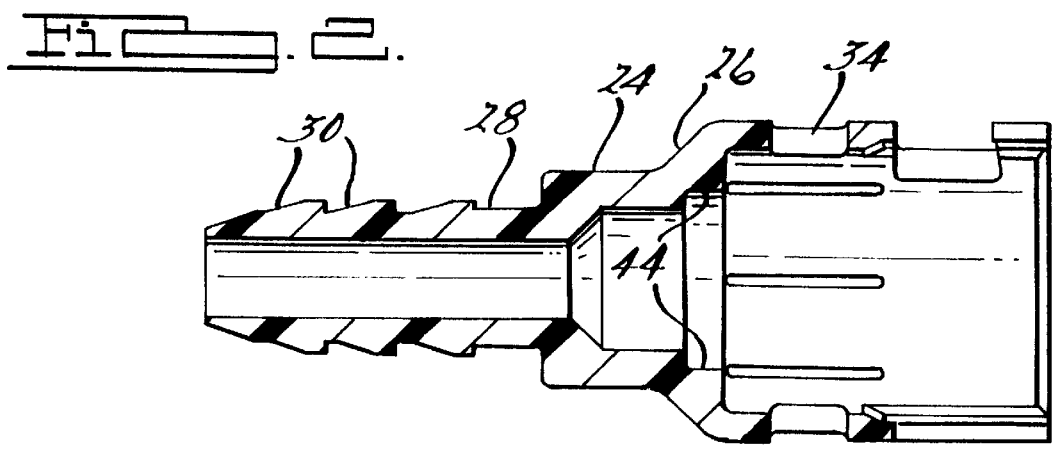
FIG. 3 is a sectional view of the housing along lines III—III of FIG. 2.

The housing, as illustrated by FIGS. 2–3, includes cylindrical portions each having an axial bore along a longitudinal axis: an enlarged diameter portion 22, a reduced diameter portion 24 and a transitional diameter portion 26. A nipple portion 28 extends from the reduced diameter portion 24 having consecutive annular ridges 30 along its outer periphery. The enlarged diameter portion 22 has an open end 32 and a cylindrical wall 33 with two circumferentially spaced locking grooves 34. The enlarged diameter portion 22 further includes an extension axially extending from the cylindrical wall 33 forming an arcuate segment 36 having an axially extending ledge 38, and the arcuate segment 36 further includes a slot 40. The axial bore of the transitional diameter portion 26 includes an annular groove 44 for an elastic O-ring 46 (FIG. 9).

The male conduit member 80 is tubular having an annular collar 82 located a given distance from a beveled end 84.

Figure 4:
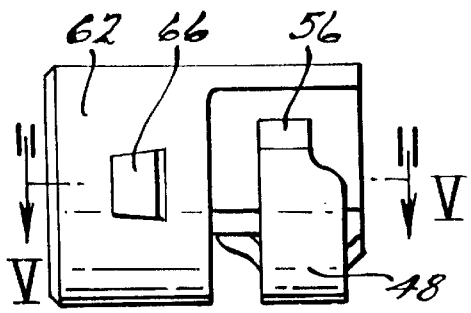
FIG. 4 is a side view of the retainer member of FIG. 1.
Figure 5:
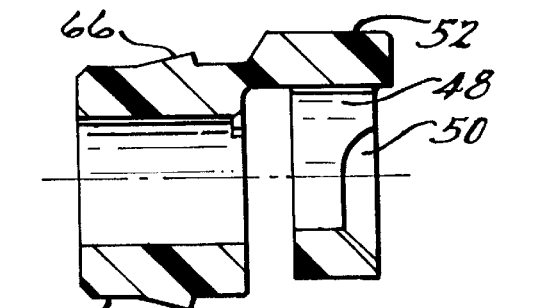
FIG. 5 is a sectional view of the retainer member along lines V—V of FIG. 4.
Figure 6:
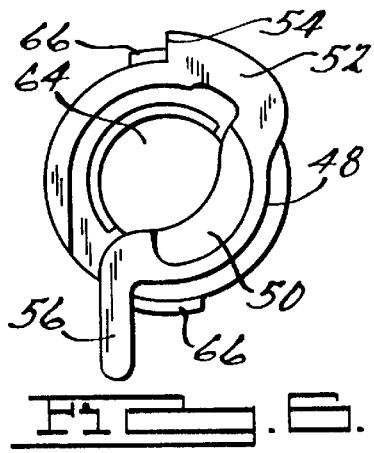
FIG. 6 is end view of the retainer element of FIG. 4.

The retainer member 60, as illustrated by FIGS. 4–6, includes a cylindrical wall 62 having an axial bore 64 and two opposing outwardly protruding detents 66 formed thereon. An arcuate locking arm 48 is integral with and hingedly supported at the proximal end of the retainer member 60 and axially spaced from the cylindrical wall 62 of the retainer member 60. The locking arm 48 further includes a beveled cam surface edge 50 upon its radially inner and proximal edge. The locking arm 48 is flexible to permit radial play about the hinged support 52, the hinged support 52 includes a radial shoulder 54. The locking arm 48 further includes a finger tab 56 at the end opposing the hinged support 52.

Figure 7:
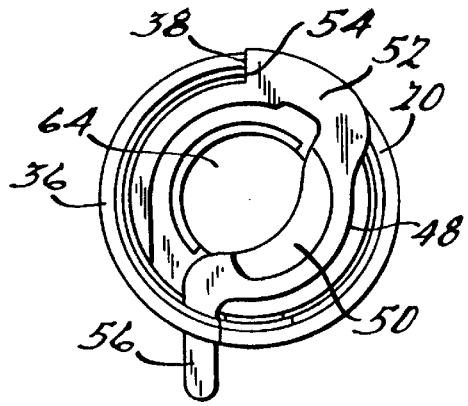
FIG. 7 is a end view of a retainer element positioned in a housing according to the present invention.
Figure 8:
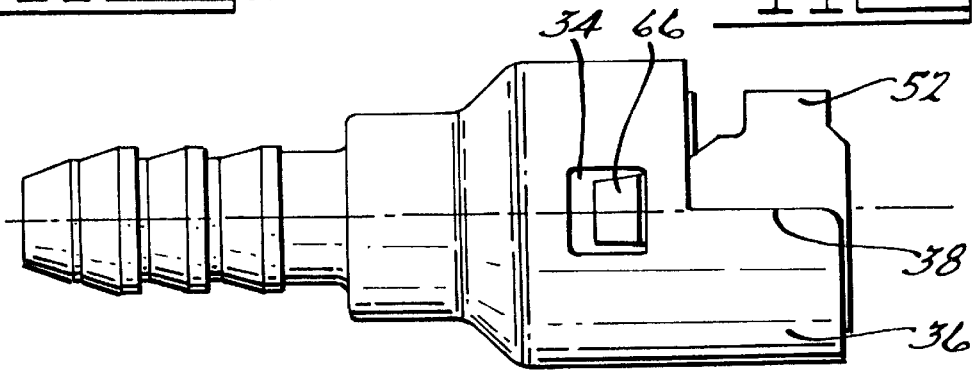
FIG. 8 is a side view of the retainer element and housing of FIG. 7.
Figure 9:
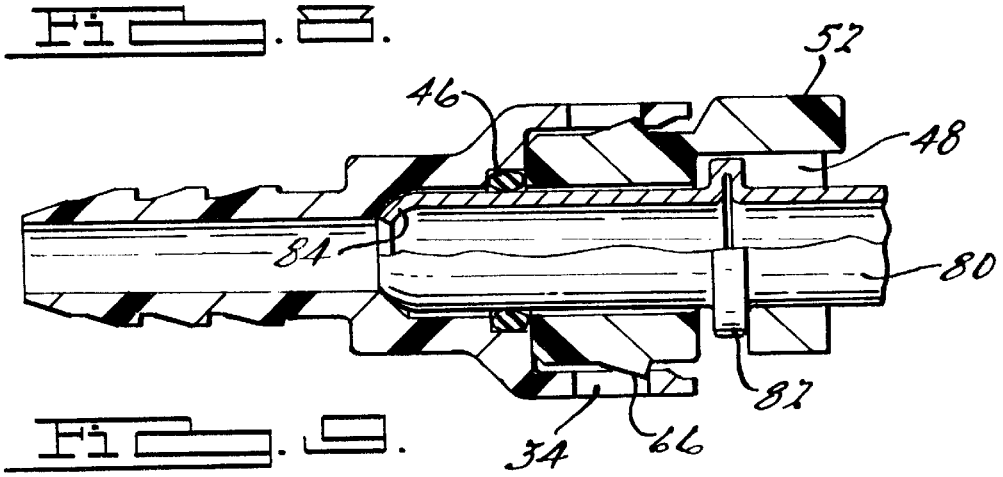
FIG. 9 is a sectional perspective of a male conduit member in operational relation with a retainer member and a housing according to the present invention.

Referring to FIGS. 7–9, cooperation between the members is illustrated. The retainer member 60 is inserted into the bore of the housing through the open end 32 with the locking arm 48 facing the arcuate segment 36. The retainer member 60 is pushed and rotated into the axial bore of the housing 20 until the detents 66 of the retainer member 60 engage the locking grooves 34 of the housing 20 to establish a locking cooperation between the elements. In this locked position, the finger tab 56 of the locking arm 48 is projected radially beyond the outer surface of the housing 20 through slot 40 of the arcuate segment 36 to allow easy thumb access, and the radial shoulder 54 of the locking arm 48 rests against the ledge 38 of the arcuate segment 36 to limit the pivotal play of the locking arm 48.

The beveled end 84 of the male conduit member 80 is inserted through the retainer member 60 into the housing 20 until the annular collar 82 engages the beveled edge 50 of the locking arm 48 to cam the locking arm 48 radially away from the male conduit member 80 allowing the annular collar 82 to pass the locking arm 48 and to rest in the axial space between the locking arm 48 and retainer member 60. The locking arm 48 pivots up and around the annular collar 82 and then down to rest against the tubular portion of the male conduit member 80 thereby locking the male conduit member 80 inside the housing 20 to create a fluid tight connection.

To release the male conduit member 80, the thumb pushes the finger tab 56 to pivot the locking arm 48 away from the annular collar 82 of the male conduit member 80 while the hand simultaneously pulls the male conduit member 80 from the retainer member 60 and housing 20. Since the force to connect and disconnect the present invention is along the longitudinal axis of a person's arm, only a small force is necessary to connect or disconnect the assembly. Additionally, since the male conduit member 80 may be released from the connection by a natural lateral motion of the thumb simultaneous with a pull motion of the hand along the longitudinal axis of the connector assembly, the release action is ergonomically sound requiring no unnatural twisting of a person's arm or wrist and can be performed by one hand with a single motion. Furthermore, no extra tool member or lock-release member is required to make the connection of the present invention.

What is claimed is:

1. A connector assembly for receiving a male conduit member having an annular collar located a given distance from the proximal end of said male conduit member, said assembly comprising:

a retainer member having a cylindrical wall forming a bore for receiving said male conduit, said wall containing two opposing outwardly protruding detents formed thereon;

an arcuate locking arm integral with and hingedly supported at the proximal end of said retainer member and axially spaced from a portion of said retainer member forming a space for receiving said annular collar, said locking arm having a beveled cam surface edge upon its radially inner and proximal edge, and said locking arm pivotal in a plane perpendicular to a longitudinal axis of said connector assembly, said hinged support comprises a radial shoulder, said locking arm further comprises a tab at the end opposing the hinged support; and a housing having a bore for receiving said retainer member in a locked position, said housing further includes a cylindrical wall having two opposing locking grooves for receiving the detents of said retainer member, said cylindrical wall further includes an arcuate segment having an axially extending ledge obstructing the rotational movement of said radial shoulder of said hinged support in said locked position, and said housing further includes a slot for receiving said tab of said locking arm, said tab projecting radially beyond the cylindrical wall of the housing.

2. A connector assembly for receiving a male conduit member having an annular collar located a given distance from the proximal end of said male conduit member, said assembly comprising:

a retainer member having a cylindrical wall forming a bore for receiving said male conduit, said wall containing at least one outwardly protruding detent formed thereon;

an arcuate locking arm integral with and hingedly supported at the proximal end of said retainer member and axially spaced from a portion of said retainer member forming a space for receiving said annular collar and said locking arm pivotal in a plane perpendicular to a longitudinal axis of said connector assembly; and a housing having a bore for receiving said retainer member in a locked position, said housing further includes a cylindrical wall having at least one locking groove for receiving the detent of said retainer member.

3. The connector assembly of claim 2 wherein the locking arm further includes a tab at the end opposing the hinged support projecting radially beyond the outer surface of the housing.

4. The connector assembly of claim 3 wherein said cylindrical wall of said housing extends axially forming an arcuate segment, said arcuate segment further includes a slot for receiving said tab.

5. The connector assembly of claim 2 wherein the hinged support of said locking arm further includes a radial shoulder and said cylindrical wall of said housing further includes an axially extending ledge, limiting rotational motion of said locking arm in said locked position.

6. The connector assembly of claim 2 wherein the wall of said retainer member further includes two opposing outwardly protruding detents formed thereon.

7. The connector assembly of claim 2 wherein the wall of said housing further includes two opposing locking grooves for receiving the detents of said retainer member.

8. A connector assembly of claim 2 wherein the locking arm further includes a beveled cam surface edge upon its radially inner and proximate edge.

* * * * *